United States Patent [19]
Farrell et al.

[11] Patent Number: 5,269,260
[45] Date of Patent: Dec. 14, 1993

[54] PORTABLE ANIMAL BATHTUB WITH RESTRAINING STRAP

[76] Inventors: Todd M. Farrell; Roxanne R. Farrell, both of 2510 Holly Brook La. Apt. #1004, Arlington, Tex. 76006

[21] Appl. No.: 944,391

[22] Filed: Sep. 14, 1992

[51] Int. Cl.⁵ .............................................. A01K 13/00
[52] U.S. Cl. ..................................... 119/158; 4/571.1
[58] Field of Search ................ 119/158, 159; 4/571.1, 4/572.1, 573.1

[56] References Cited

U.S. PATENT DOCUMENTS

| | | | |
|---|---|---|---|
| 937,476 | 10/1909 | Shipp | 4/572.1 |
| 1,879,915 | 9/1932 | Smoot | 119/158 |
| 2,438,979 | 4/1948 | Short | 119/158 |
| 3,023,734 | 3/1962 | Schaub | 119/158 |
| 4,056,078 | 11/1977 | Blafford et al. | 119/158 |
| 4,083,328 | 4/1978 | Baker | 119/158 |
| 4,836,144 | 6/1989 | Cole | 119/158 |

FOREIGN PATENT DOCUMENTS 1018639  1/1966  United Kingdom ................ 4/573.1

Primary Examiner—Gene Mancene
Assistant Examiner—Todd E. Manahan

[57] ABSTRACT

A portable bathtub for washing animals comprises a self-standing tub having a base, opposing side walls and opposing end walls, and a restraining device for restraining the animal in the tub. The restraining device includes a pair of straps which pass through slits in the side walls. One end of each strap is attached to the respective side wall exteriorly of the tub by a hook-and-loop fastener such that the effective length of the strap can be adjusted. The other end of each strap has a snap hook thereon for fastening to the animal's collar. A drainage outlet is provided in one end wall and has a straining device therein. A removable plug is fit in the drainage outlet.

3 Claims, 1 Drawing Sheet

PORTABLE ANIMAL BATHTUB WITH RESTRAINING STRAP

BACKGROUND

1. Field of Invention

This invention relates to bathtubs, specifically to bathtubs which are used for bathing animals.

2. Description of Prior Art

Inventors have created several types of bathing apparatus for animals. U.S. Pat. No. 1,760,017 to Smoot (1930) discloses a tub with a trough extension which makes the tub bulky and possibly heavy. U.S. Pat. No. 4,987,860 to Davis (1991) includes many component which adds weight to the apparatus.

Ease of use is eliminated when an apparatus is bulky and heavy. Also, the above mentioned patents along with U.S. Pat. No. 3,749,064 to Weinstein and Carenza (1973) make use of spraying devices used to spray the animal with water, soap and insecticides. These components are expensive to manufacture and increase the possibility of malfunctions.

More manipulation is required to use the bathtubs with several components along with the requirement of time to secure the animal in the proper place for spraying. U.S. Pat. No. 4,326,433 to Hebert (1982) makes use of an animal stand to perform animal washing. Although this type of bathing device is fairly inexpensive to produce and easy to use, a bathtub is required to hold the water. This requirement eliminates portability.

OBJECTS AND ADVANTAGES

Accordingly, several objects and advantages of the present invention are:

(a) to provide a bathtub that is simple to use;
(b) to provide a bathtub that is cost efficient to manufacture and market;
(c) to provide a bathtub that is portable;
(d) to provide a bathtub that is durable;
(e) to provide a bathtub that does not require assembly with each use;
(f) to provide a bathtub that can be produced in different sizes and colors to fit the needs and desires of the animal owner;
(g) to provide a bathtub that can be used for dipping or de-fleaing;
(h) to provide a bathtub that can be used to restrict free movement of the animal during grooming and drying;
(i) to provide a bathtub that can be used for other applications when not in use as described above (i.e. recycling container, laundry basket, storage container for firewood, etc.).

Further objects and advantages are to provide a means of bathing, dipping, grooming, and drying an animal with little hassle to the user, to eliminate spraying devices, stands, and cages, of which add complexity of use, increased cost, and increased weight, to provide a simple and marketable product that can be used in a variety of locations due to its portability, and to provide this bathtub at minimum cost to the user and manufacturer.

BRIEF DESCRIPTION OF THE DRAWINGS

In the drawings, closely related figures have the same number but different alphabetic suffixes.

REFERENCE NUMERALS IN DRAWINGS

Figure 1:
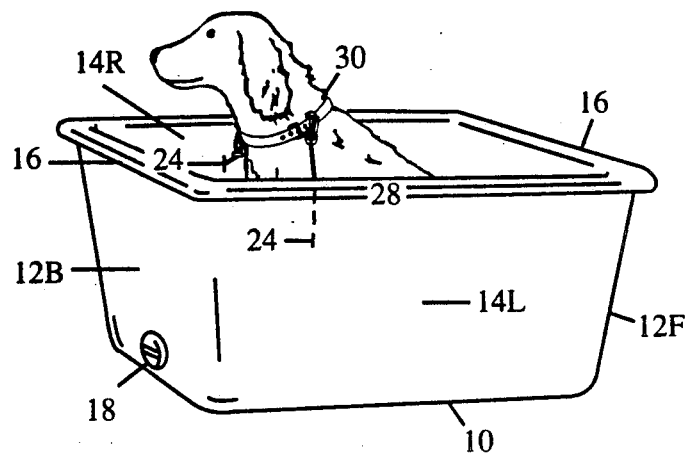
FIG. 1 shows an overall view of the portable animal bathtub and indicates the vertical slits in which a hook and loop fastener strap with a snap hook attached at one end comes through each side, the corresponding hook and loop fastener on the outside, the drainage outlet and drainage plug locations, and the top to bottom inward sloping nature of the sides of the bathtub.

10: base bathtub
12: bathtub ends (F) or (B)
14: bathtub sides (R) or (L)
16: gripping position
18: drainage outlet
20: straining device
22: drainage plug
24: vertical slit
28: hook and loop fastener strap
30: snap hook
32: animal collar.

DESCRIPTION—FIGS. 1 TO 5

A typical embodiment of the portable animal bathtub is illustrated in FIG. 1. In the preferred embodiment the entire bathtub is made of durable but lightweight plastic. Certain areas of the bathtub, as described in the following, will be reinforced using additional layers of the plastic to meet the requirement for extra support.

The base 10 of the bathtub, which lies in a horizontal position, is shown in FIG. 1 wherein it is indicated that the right and left sides, 14R and 14L respectively, of the bathtub slope outward from bottom to top. The front and back sides, 12F and 12B respectively, are perpendicular to the base.

Figure 5:
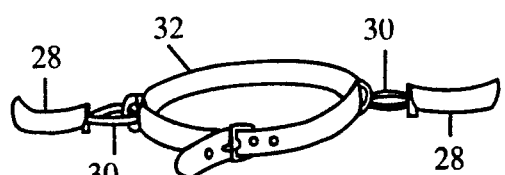
FIG. 5 shows a more detailed drawing of the hook and loop fastener strap and a snap hook.
Figure 4:
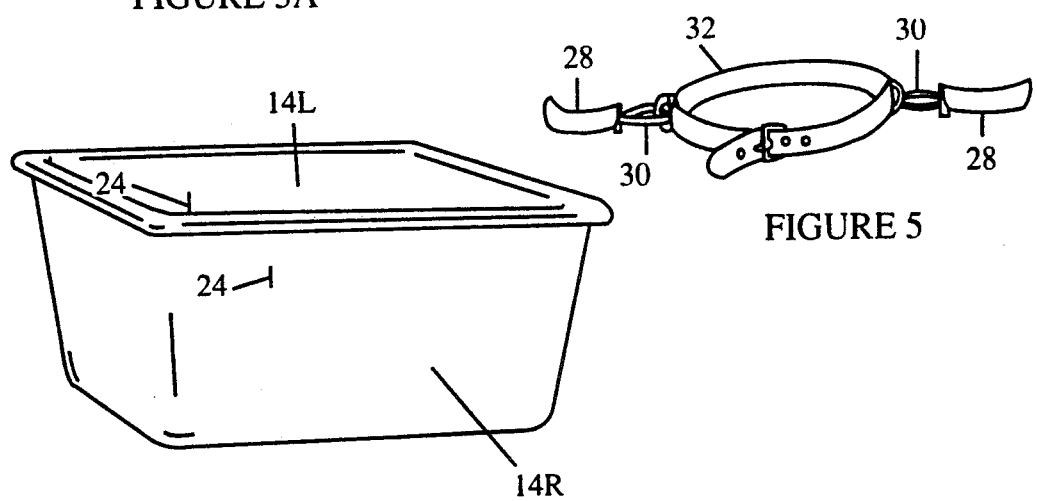
FIG. 4 shows the sides of the bathtub that contain one vertical slit and a horizontal hook and loop fastener.

The right and left sides 14R and 14L shown in FIG. 4 contain a vertical slit 24 that is reinforced with additional layers of plastic. A restraining device comprising a hook and loop fastener 28 with a snap hook 30, as depicted in FIG. 5, passes through the vertical slit 24 as is indicated in FIG. 1. The hook and loop fastener 28 will then be attached to the hook and loop fastener 28, 26 that is permanently connected to the bathtub as is indicated in FIG. 4.

Figure 2:
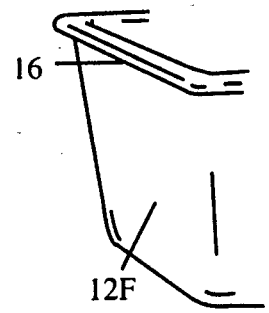
FIG. 2 shows the front end of the bathtub indicating the gripping position.
Figure 3A:
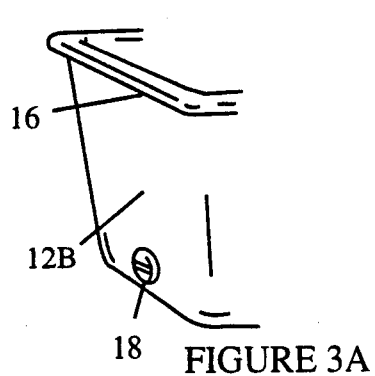
FIG. 3A shows the back end of the bathtub indicating the gripping position and the location of the drainage outlet.
Figure 3B:
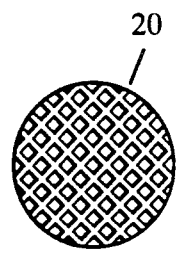
FIG. 3B shows the drainage outlet with the straining device.

The front and back ends 12F and 12B shown separately in FIGS. 2 and 3A respectively contain a gripping position 16 that is reinforced with additional layers of plastic. The back end includes a drainage outlet 18 that is reinforced with additional layers of plastic and which is illustrated in detail in FIG. 3B. More specifically the drainage outlet 18 contains a straining device 20.

Figure 3C:
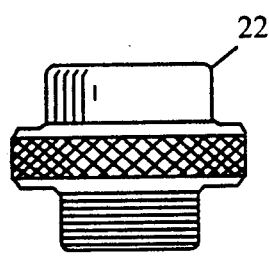
FIG. 3C shows the drainage plug.

The drainage outlet 18 requires a drainage plug 22 that fits securely to prohibit leakage. The drainage plug is illustrated in FIG. 3C and screws into the drainage outlet 18 while protruding from the bathtub to allow removal when necessary.

From the description above, a number of advantages of our portable animal bathtub become evident. An animal bathtub can be made to meet the requirements of: portability, durability, lightweight, and simplicity.

OPERATION

The manner of using the portable animal bathtub is very similar to the manner of using a household bathtub. For this reason, simplicity is established. Since the bathtub is portable, the bathing or de-fleaing tasks can be performed wherever the user desires.

One needs to ensure the drainage plug 22 is securely screwed into the drainage outlet 18. The animal should be placed in the bathtub and bound using the snap hooks 30 by attaching the snap hooks to the collar of the animal as shown in FIG. 5. The hook and loop fasteners 28 are then tightly attached to the hook and loop fasteners 28 on the right and left sides 14R and 14L of the bathtub. Adjustment of the hook and loop fastener 28 may be necessary on the right and left sides 14R and 14L to ensure comfort to the animal while freedom of movement to the animal is limited by the securing devices.

The next step is to fill the bathtub with the appropriate liquid (i.e. water, soap and water solution, or flea dipping solution). Care should be taken during this step not to fill the bathtub too full as to ensure the safety of the animal.

If so desired while the animal is securely fastened, the bathtub can be drained and filled again to repeat a task or advance to the next task. Another option is to rinse the animal with the drainage plug 22 removed allowing the water to flow freely from the bathtub.

SUMMARY, RAMIFICATIONS, AND SCOPE

Thus the reader will see that the bathtub provides a simple means of accomplishing a tedious task. Due to the minimum weight of the apparatus almost any person can use the bathtub to perform the bathing and defleaing duties required for their animal. The portable animal bathtub is lightweight but durable. The bathtub is simple to use but portable. Furthermore, the bathtub is economical to the user and the manufacturer.

While our above description meets the requirements deemed necessary for our invention, these should not be construed as limitations on the scope of the invention, but rather as an exemplification of one preferred embodiment thereof. Although other variations are possible and have previously been patented, including bathtubs with spraying devices, cages, and stands, they do not fulfill the requirements set forth as important to the consumer and manufacturer. Accordingly, the scope of the invention should be determined not by the embodiment illustrated, but by the appended claims and their legal equivalents.

We claim:

1. A portable bathtub for washing animals comprising:
    a tub having a base, a pair of opposing side walls, and a pair of opposing end walls, said side and end walls connected to and extending upwardly from said base so as to form a water retentive enclosure;
    a slit formed in each of said side walls; and
    a restraining device for restraining an animal in the tub, said restraining device including a strap attached to each of said side walls exteriorly of the tub by a hook-and-loop fastener such that the effective length of said strap may be adjusted, said strap passing through said slit in the respective side wall so that one end of said strap is disposed inside said tub, said one end of said strap having fastening means thereon for attachment to the animal.

2. The portable bathtub of claim 1, wherein said tub further includes a drain means disposed therein for selectively draining water from the tub.

3. The portable bathtub of claim 2, wherein said drain means comprises:
    a drainage outlet formed in one of said walls;
    a straining device positioned within said drainage outlet; and
    a plug removably fit in said drainage opening for selective closure thereof.

* * * * *